United States Patent

Yoshikawa

[15] 3,668,648

[45] June 6, 1972

[54] DATA PROCESSING SYSTEM

[72] Inventor: Kinichi Yoshikawa, Tokyo, Japan

[73] Assignee: Ricoh Co., Ltd., Tokyo, Japan

[22] Filed: June 15, 1970

[21] Appl. No.: 46,370

[30] Foreign Application Priority Data

June 18, 1969 Japan....................................44/47627

[52] U.S. Cl...........................340/172.5, 35/8 R, 179/100.2 S
[51] Int. Cl........................................G05b 19/38, G05b 19/42
[58] Field of Search.................340/172.5; 179/100.1, 100.2; 35/8, 9, 13

[56] References Cited

UNITED STATES PATENTS

| | | | |
|---|---|---|---|
| 3,210,864 | 10/1965 | Tillotson et al. | 35/9 |
| 3,294,924 | 12/1966 | Fein | 179/100.1 |
| 2,965,720 | 12/1960 | Bumstead et al. | 179/100.1 |
| 3,550,288 | 12/1970 | Svala et al | 35/8 |
| 3,222,597 | 12/1965 | Beatenbough et al. | 35/8 |
| 3,280,270 | 10/1966 | Allington | 179/100.2 |

*Primary Examiner*—Paul J. Henon
*Assistant Examiner*—Jan E. Rhoads
*Attorney*—Henry T. Burke, Robert Scobey, Robert S. Dunham, P. E. Henninger, Lester W. Clark, Gerald W. Griffin, Thomas F. Moran, R. Bradlee Boal, Christopher C. Dunham and Ivan S. Kavrukov

[57] ABSTRACT

The invention provides a data processing system wherein a data processing equipment such as punched typewriter is operated by a magnetic tape upon which are recorded in alternating sequence digitally coded signal groups and audio signal groups which are used to give an operator instructions as to the operation of the equipment, tape, etc. A special code inserted at the end of each of the digitally coded signal groups indicates the switching from the digitally coded signal group to the audio signal group. A switching audio signal (for example an 800 Hz tone) is inserted at the end of the audio signal group to indicate switching from the audio signal group to the digitally coded signal group.

4 Claims, 5 Drawing Figures

INVENTOR
KINICHI YOSHIKAWA

BY Henry T. Burke
ATTORNEY

PATENTED JUN 6 1972 3,668,648

SHEET 2 OF 2

INVENTOR
KINICHI YOSHIKAWA

BY Henry T. Burke
ATTORNEY

DATA PROCESSING SYSTEM

BACKGROUND OF THE INVENTION

The present invention relates to a data processing system and more particularly a data processing system employing a magnetic tape upon which are recorded in alternating sequence digitally coded signal groups and audio signal groups.

It is known to operate typewriters or the like (such as a punched typewriter) by a magnetic tape upon which are recorded digitally coded programs. A plurality of programs are generally recorded on the same magnetic tape, and an operator must perform various manual operations, such as switching data processing devices, depending upon the contents of the programs.

In some cases, the execution of a program recorded on one tape is interrupted so as to execute another program from another tape and then the first program is executed again. When such operations are repeated many times among many programs recorded on different tapes, the operator must remember the sequence of execution of these programs. This imposes a heavy burden upon the operator and frequent errors tend to occur.

SUMMARY OF THE INVENTION

The principal object of the present invention is to provide a data processing system employing a magnetic tape upon which are recorded programs in digital code, which system may lessen the burden on the operator. To this end, the present invention provides a data processing system employing magnetic tapes upon which are recorded in alternating sequence digital-coded signal groups and audio signal groups. These signal groups may be alternately reproduced so as to operate, for example, a punched tape typewriter by means of the digitally coded signal groups and to give the operator instruction as to the next operation by means of the audio signals.

According to another aspect of the present invention, a special function code is inserted at the end of the digitally coded signal group so that when this function code is read out (reproduced), the data system is switched to reproduce the audio signals.

The digital-coded signals reproduced are sequentially transferred through a switching circuit to a shift register, and when a group of signals (e.g. one character) are transferred in the shift register, they are transferred in parallel to a buffer memory and then to a decoder so as to operate, for example, a typewriter. This operation is continued as long as digital-coded signal group is reproduced. When the special function code inserted at the end of a digital-coded signal group is read out, it is decoded by the decoder to switch the data processing system to the audio reproduction system so that the audio signals following the function code are reproduced (as through a loud speaker) to instruct the operator as to further manual operations. When a signal indicative of termination of the audio signal group is reproduced, the operator may manually switch the audio reproduction system to the data processing device. In an alternative embodiment it is possible to switch automatically the audio reproduction system to the data processing device.

The above and other objects, features and advantages of the present invention will become more apparent from the following description of one illustrative embodiment thereof taken in conjunction with the accompanying drawing.

BACKGROUND OF THE INVENTION

Figure 1:
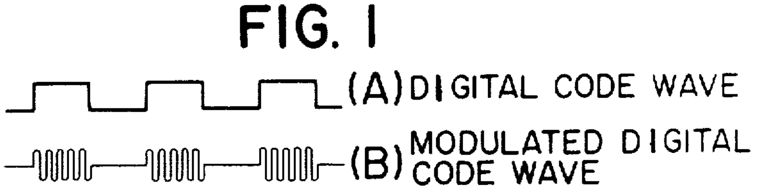
FIG. 1 illustrates waveforms of digitally coded signals recorded on a magnetic tape.

In general, digital codes such as those shown in FIG. 1(A) are modulated by a carrier wave (for example 4.5 kHz) as shown in FIG. 1(B) and then recorded on magnetic tape. The contents of the information thus recorded on the tape may be identified by the labels pasted on the reels of tape. For example, punched tape typewriters may be operated under the control of these magnetic tapes by an operator following instructions on these labels to switch data processing equipment or tapes. Sometimes it is difficult to retrieve a desired portion of the recorded information from the magnetic tape only from the instruction in the labels. When a large number of programs are recorded and used, both the equipment and tapes must be switched very often and in complicated sequences, and errors may occur.

DESCRIPTION OF THE PREFERRED EMBODIMENT

Figure 2:
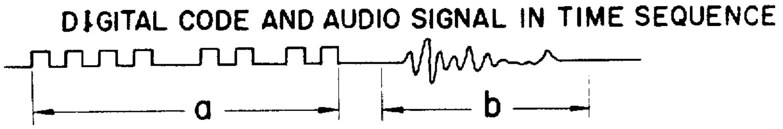
FIG. 2 illustrates an alternating sequence of digitally coded signals and audio signals for use in accordance with the present invention.
Figure 3:
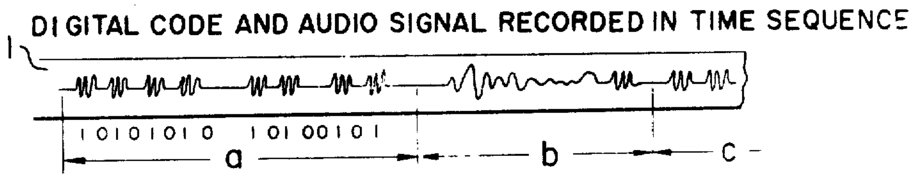
FIG. 3 illustrates the signals of FIG. 2 in the form in which they are on magnetic tape.

FIG. 2 is a diagrammatic view illustrating one example of signal waveforms which are for recording on magnetic tape for data processing. The digitally coded signals are in the portion *a* while the audio signals are in the portion *b*. FIG. 3 is a diagrammatic view illustrating the signals shown in FIG. 2 recorded in the tape 1 after suitable carrier wave modulation. The digitally coded signals are recorded in the portion *a;* the audio signals are recorded in the portion *b;* and the next digitally coded signals are recorded in the portion *c*. In order to operate a switching circuit (described in more detail hereinafter), a special function code may be inserted at the trailing end of the digitally coded signal group, while at the trailing end of the audio signal group there may be recorded a signal which indicates the termination of this audio signal group and is reproducible as a tone of, for example, 800 Hz.

Figure 4:
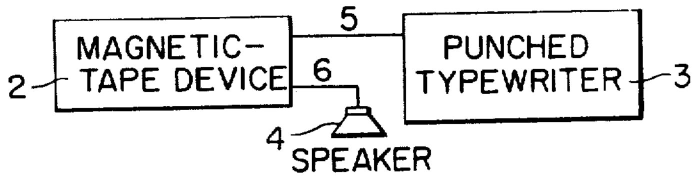
FIG. 4 is a brief block diagram of a data processing system embodying the present invention.

FIG. 4 is a brief block diagram of a data processing system embodying the present invention. A data processing equipment such as a typewriter 3 (which may be a punched tape typewriter) is operated through a magnetic tape device 2 by digitally coded signals, and audio signals are reproduced through a loudspeaker 4. While a switching circuit (not shown in this Figure) is connecting the tape device 2 and the typewriter 3, digitally coded signals reproduced in the magnetic tape device 2 are transferred through a line 5 to the typewriter 3. In response to a function code inserted at the tailing end of the digitally coded signal group, the switching circuit switches the magnetic tape device 2 to the loudspeaker 4 so that audio signals are transferred through the line 6 to the loudspeaker 4. When the tone of 800 Hz is reproduced at the termination of the audio signal group, the operator switches the switching circuit from the loudspeaker 4 to the typewriter 3. The above-described sequence of operation may be repeated. The switching from the loudspeaker 4 (that is, from the audio signal group) to the typewriter 3 (that is, to the digitally coded signal group) may be automatically accomplished in an alternative example described hereinafter.

Figure 5:
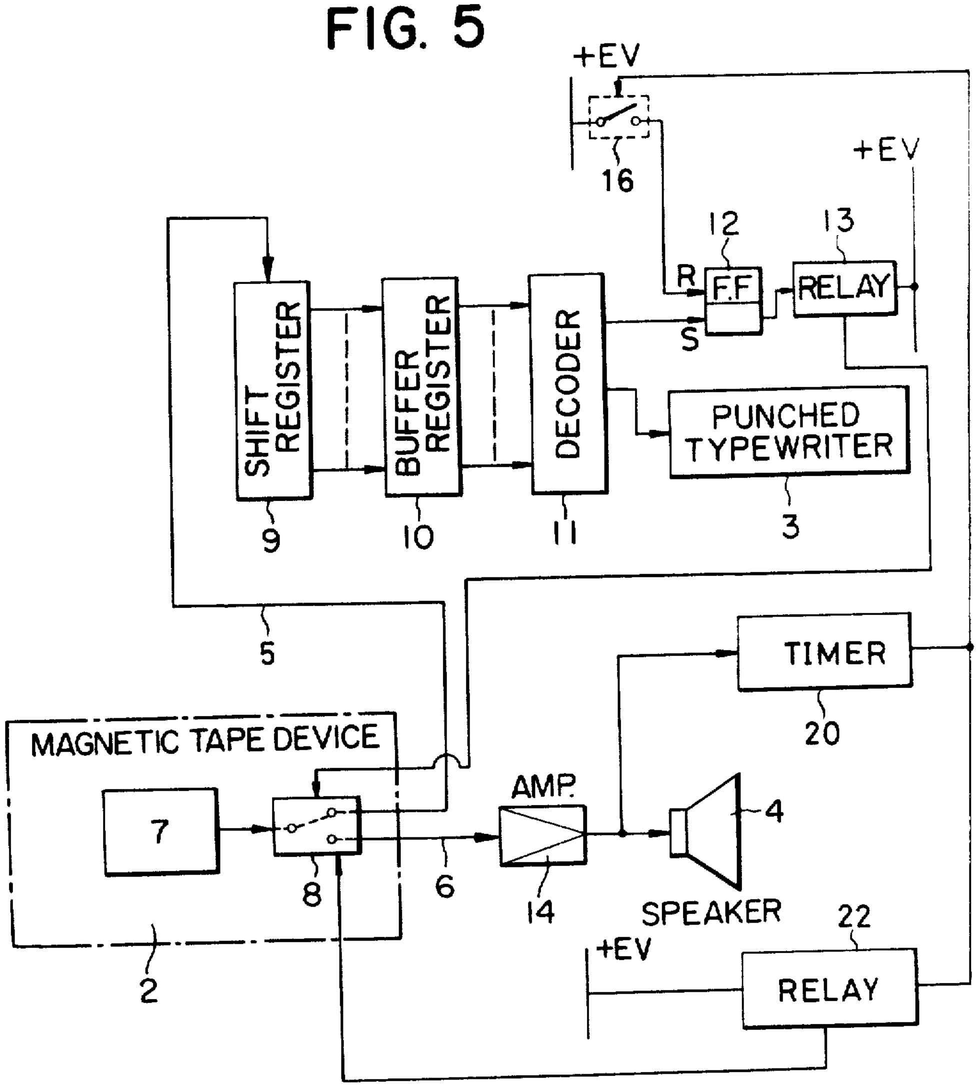
FIG. 5 is a more detailed block diagram illustrating an embodiment of the present invention.

FIG. 5 is a more detailed block diagram illustrating an embodiment of the invention. The magnetic tape device 2 comprises a reproduction unit 7 and a switching circuit 8 connected in series. One output terminal of the switching circuit 8 is connected through the line 5 to a shift register 9 which in turn is connected to a decoder 11 through a buffer register 10 which may, for example, have capacity of one character. The decoder 11 is connected to the typewriter 3 through one output line and to the set input terminal of a flip-flop 12 through another output line. The RESET input terminal of the flip-flop 12 is connected to a power source (+EV) through a switch 16. The output terminal of the flip-flop 12 is connected to a relay 13 which actuates the switching circuit 8 in the magnetic tape device 2. The other output terminal of the switching circuit 8 is connected to the loudspeaker 4 through an amplifier 14.

When the switching circuit 8 is connected to the line 5 and when the digitally coded signal group is being reproduced by the recording-reproduction unit 7, the reproduced signals are applied to the shift register 9 through the switching circuit 8. When the information of one character is transferred into the shift register 9, it is transferred in parallel to the decoder 11 through the buffer register 10. Then the information transferred to the decoder is decoded and applied to the typewriter 3 to operate it accordingly as described for example in Murayama, U.S. Pat. No. 3,482,215. The typewriter 3 operates in this manner so long as digitally coded characters are being decoded by the decoder 11. When, however, the decoder 11 detects a special function code at the trailing end of the digitally coded information group, it actuates the line connected to the SET input of the flip-flop 12, and the flip-flop 12 is set, thereby energizing the relay 13. When energized, the relay 13 causes the switching circuit 8 to connect the reproduction unit 7 to the line 6 so that the audio signals which follow the special function code are reproduced through the amplifier 14 and the loudspeaker 4, thus giving instructions to the operator. When the tone of 800 Hz is reproduced at the end of the audio signal group, the operator closes the switch 16 to reset the flip-flop 12. When the flip-flop 12 is reset, the relay is deenergized, and the switching circuit 8 is connected to the line 5. Then, the digitally coded information group which follows the audio signal is applied to the typewriter 3 through the switching circuit 8, the shift register 9, the buffer 10 and the decoder 11 in the same manner as described above.

A timer 20 may be provided so as to be actuated by the 800 Hz tone signal following an audio signal group, so that the switch 16 may be closed by the timer 20 after a predetermined time delay. A relay 22 is also operated by the timer 20 to cause the switching circuit 8 to connect the reproducing device 7 to its output line 5 after the 800 Hz tone signal. Thus, the switching between the data processing device (represented by the typewriter 3) and the audio reproduction system (represented by the speaker 4) may be accomplished automatically.

It is understood that any other suitable data processing equipment may be used in place of the typewriter 3. Furthermore, any other suitable device may be used in place of the loudspeaker 4 to give instructions to the operator. The digitally coded signal groups are not necessarily programmed codes but may be, for example, data groups.

Thus, the invented data processing system utilizes information recorded on recording mediums such as magnetic tape to control a peripheral device such as a typewriter and utilizes information also recorded on the same mediums to provide suitable instructions to an operator to guide the operator in manipulating the system. The invented system includes a reproducing means 7 which may be means for reading the information recorded on the magnetic tape which information may comprise first groups of signals which are digitally coded signals and second groups of signals which are audio signals. The digitally coded and the audio signals are arranged on the tape in alternating sequence and each transition from digitally coded signals to audio signals is marked by a special function digital signal recorded on the tape, while each transition from audio signals to digitally coded signals is marked by a switching signal which may be a steady 800 Hz tone. A switching means 8 has two output lines 5 and 6 and serves to selectively connect the output of the reproducing means 7 either to the output line 5 or to the output line 6. The switching means 8 is under the control of a control means which causes the switching means 8 to provide the digitally coded signals from the reproducing means 7 at the output line 5 and to provide the audio signals from the reproducing means 7 at the output line 6.

The system begins by applying digitally coded signals from the output 5 of the switching means 8 to a shift register 9. The digital signals are read into the shift register 9 serially and, when the shift register 9 is filled to capacity, the information contained therein is transferred in parallel to the buffer register 10 and, from there, in parallel to a decoder 11. The decoder 11 transfers decoded digital signals to operate a peripheral device such as a typewriter 3 which may be a punched tape typewriter to operate the typewriter accordingly. The typewriter 3 is operated under the control of the decoded digital signals until the reproducing means 7 reads the special function signals which signifies a transition to audio signals. When that special function signal is decoded by the decoder 11 a flip-flop 12 is set, and a relay 13 is energized to cause the switch means 8 to discontinue transferring signals to its output line 5 and to commence transferring to its output line 6 the audio signals which follow the special function digital signal. The audio signals are transferred to a utilization means which includes an amplifier 14 and the speaker 4 which reproduce the audio signals to provide oral instructions to an operator of the system. The operator of the system may switch the switching means 8 back to its output line 5 in response to an oral instruction provided over the speaker 4 , or — alternatively — a switching signal in the form of a steady tone of, for example, 800 Hz may be used to activate a timer 20 which in turn activates a relay 22 to cause the switching means 8 to change from its output line 6 to its output line 5 and also opens the switch 16 to remove the reset signal from the RESET input of the flip-flop 12. In this manner automatic switching from digital to audio signals and from audio to digital signals is carried out.

I claim:

1. A data processing system for utilizing information recorded on recording medium such as magnetic tape to control a peripheral device such as a typewriter and to provide suitable instructions to an operator to guide said operator in manipulating the system, comprising:
   a. a reproducing means for reading information recorded on said medium, said information comprising an alternating series of first and second groups of signals, the first groups of signals being digitally coded signals, each transition from a first to a second group of signals marked by a special function digital signal;
   b. switching means connected to the reproducing means for selectively transferring the information read by the reproducing means to a first or a second output of the switching means;
   c. a decoder connected to the first output of the switching means for decoding signals received therefrom, said decoder having a first output energizible in response to said special function signal and a second output providing decoded first groups of signals;
   d. a peripheral device connected to said second decoder output and responsive to said decoded first groups of signals for generating a record thereof;
   e. control means responsive to the energization of the first decoder output for causing the switching means to discontinue transferring signals to its first output and to commence transferring signals to its second output, whereby the second switching means output transfers second groups of signals; and
   f. utilization means connected to the second output of the switching means to utilize said second groups of signals for guiding an operator in manipulating the system.

2. A data processing system as in claim 1 wherein a transition from a second to a first group of signals is marked by a switching signal recorded on the recording medium, and including means responsive to said switching signal to cause the switching means to discontinue transferring signals to its second output and to commence transferring signals to its first output.

3. A data processing system as in claim 1 including a shift register and a buffer register interposed between the first output of the switching means and the decoder, said shift register serially receiving digital signals from the switching means, said buffer register receiving the contents of the shift register in parallel and transferring said contents to the decoder in parallel.

4. A data processing system as in claim 1 wherein said peripheral device is a punched tape typewriter, wherein said second groups of signals are audio signals for giving oral instructions to an operator, and wherein said utilization means includes audio signal reproducing means.

* * * * *